(12) United States Patent
Zhou

(10) Patent No.: US 9,050,663 B2
(45) Date of Patent: Jun. 9, 2015

(54) HAND-HELD POWER TOOL WITH A QUICK-CLAMPING DEVICE FOR A WORKING ELEMENT

(75) Inventor: Hongtao Zhou, Nanjing (CN)

(73) Assignee: Chervon (HK) Limited, Hong Kong (HK)

( * ) Notice: Subject to any disclaimer, the term of this patent is extended or adjusted under 35 U.S.C. 154(b) by 778 days.

(21) Appl. No.: 13/238,821

(22) Filed: Sep. 21, 2011

(65) Prior Publication Data

US 2012/0074657 A1 Mar. 29, 2012

(30) Foreign Application Priority Data

Sep. 26, 2010 (CN) .......................... 2010 1 0505094

(51) Int. Cl.
*B23B 31/02* (2006.01)
*B23B 31/40* (2006.01)

(52) U.S. Cl.
CPC ........... *B23B 31/4073* (2013.01); *Y10T 279/23* (2015.01); *Y10T 279/32* (2015.01); *Y10T 279/33* (2015.01)

(58) Field of Classification Search
CPC .................................................. B23B 31/4073
USPC ................... 279/141; 83/597, 697, 698, 782; 30/330, 339, 331; 451/356, 357, 359
See application file for complete search history.

(56) References Cited

U.S. PATENT DOCUMENTS

| | | | | |
|---|---|---|---|---|
| 2,581,690 | A * | 1/1952 | Moehle et al. | 411/308 |
| 6,569,001 | B2 * | 5/2003 | Rudolf et al. | 451/344 |
| 7,344,435 | B2 * | 3/2008 | Pollak et al. | 451/342 |
| 2006/0009140 | A1 * | 1/2006 | Sommers et al. | 451/523 |
| 2008/0031704 | A1 * | 2/2008 | Bobo | 411/411 |
| 2009/0023371 | A1 * | 1/2009 | Blickle et al. | 451/359 |
| 2010/0052269 | A1 * | 3/2010 | Zaiser et al. | 279/144 |

* cited by examiner

*Primary Examiner* — Eric A Gates
*Assistant Examiner* — Chwen-Wei Su
(74) *Attorney, Agent, or Firm* — Greenberg Traurig, LLP

(57) ABSTRACT

A hand-held power tool with a quick-clamping device for a working element includes a working mandrel for driving the working element, a fastening member for fastening the working element onto the end of the working mandrel, and a locking assembly. The fastening member includes a clamping shaft insertable into the working mandrel and a moving assembly for making the fastening member moveable between a releasing position and a clamping position. The locking assembly includes a floatable clamping component and the clamping component and the clamping shaft are provided with corresponding toothed portions such that engagement and disengagement therebetween is selectively achieved by the relative rotation of the toothed portions.

11 Claims, 5 Drawing Sheets

HAND-HELD POWER TOOL WITH A QUICK-CLAMPING DEVICE FOR A WORKING ELEMENT

CROSS REFERENCE TO RELATED APPLICATION

This application claims the benefit of Chinese Patent Application Ser. No. CN201010505094.X filed Sep. 26, 2010, the disclosure of which is incorporated herein by reference in its entirety.

FIELD OF THE DISCLOSURE

The present description relates generally to a hand-held power tool and more particularly to a hand-held-power tool with a quick-clamping device for a working element.

The quick-clamping device includes a working mandrel for driving the tool and a fastening member for clamping a working element onto the end of the working mandrel. The tool further comprises a moving device for making the fastening member movable between a releasing position and a clamping position, wherein the fastening member can be detached from the working mandrel by disengaging from the moving device at the releasing position and contrarily the fastening member can abut against the end of the working mandrel to reliably clamp the working element by locking with the moving device and with the cooperation of an elastic element at the clamping position.

BACKGROUND OF RELATED ART

A hand-held power tool with a quickly-clamping device is generally known from U.S. Pat. No. 6,569,001 B2, which is an angular polishing machine provided with a hollow working mandrel therein. The hollow working mandrel is mounted with a clamping device movable along the axial direction of the mandrel between a clamping position and a releasing position, wherein the clamping device includes a clamping flange provided with a threaded pin at the middle part thereof for mating with a counter flange on the end of the hollow mandrel, so that the working element is clamped between the clamping flange and the counter flange. The hollow mandrel is further provided with a thrust component mating with the threaded pin. At the clamping position, the threaded pin is screwed into the screw thread of the thrust component and is held at this clamping position under the action of spring force; at the releasing position, the thrust component pushes the threaded pin so as to drive the clamping flange to overcome the action of spring force to disengage from the surface of the clamped working element. At this time, because there is no friction force when the clamping flange and the clamped working element rotate relative to each other, the threaded pin of the clamping flange can be manually screwed out of the thrust component without resorting to any accessories, and the working element can be expediently replaced.

Although this clamping device can substantially clamp the working element to the working mandrel of the hand-held tool without any auxiliary tools, this clamping device is only suitable for clamping the working element which is driven rotationally. If the working element is driven by a vibration device so that the working element swings fore-and-aft along the longitudinal axis of the working mandrel, then it results in a greater mutational torque creating along the two rotating directions and a huge impact, so that it is impossible to ensure that the working element is clamped sufficiently and firmly by a known clamping device.

SUMMARY

Regarding the existent deficiencies of the above prior arts, the following disclosure provides a hand-held power tool, which fastens a working element to a working mandrel in a simple and reliable means without requiring any auxiliary tools such as wrench etc. The tool may achieve a clamping force strong enough to ensure that under normal operating conditions, the working element is clamped sufficiently and firmly even in the case that the impacts occur in the tool driven by, for example, a vibration driver.

To this end, to solve the above technical problems, the present disclosure may provide at least the following technical solutions.

A hand-held power tool with a quick-clamping device for a working element, including a working mandrel for driving the working element, the working mandrel having a working end, a fastening member for fastening the working element on the working end, the fastening member including a clamping shaft insertable into the working mandrel, and a moving assembly for making the fastening member move between a releasing position and a clamping position. The fastening member may be detachable from the working mandrel at the releasing position and the fastening member may be clamped against the working end of the working mandrel by means of a clamping force at the clamping position. A locking assembly may be received in the working mandrel for locking the clamping shaft at the clamping position so that the clamping shaft can not be taken out and for loosening the clamping shaft at the releasing position so that the clamping shaft can be taken out of the working mandrel. The locking assembly may include a clamping component floatable along the direction of a longitudinal axis Y of the working mandrel and may be provided with a second toothed portion. The clamping shaft may be provided with a first toothed portion for mating with the second toothed portion, wherein both the second toothed portion and the first toothed portion have teeth extending circumferentially so that the second toothed portion engages with the first toothed portion at the clamping position and the second toothed portion disengages with the first toothed portion at the releasing position.

In at least one example, a first resilient element exerting force along the direction of the axis Y acts onto the clamping component. The direction along which the first resilient element exerts force onto the clamping component is the direction along which the fastening member inserts into the working mandrel.

According to the present disclosure, toothed portions extending circumferentially are provided on the clamping component and the clamping shaft, and are selectively engaged and disengaged in a way that the second toothed portion rotates an angle relative to the first toothed portion, so as to achieve the detachment and fixation of the fastening member, which is structurally simple and can reliably fasten the working element onto the working mandrel without any auxiliary tools such as wrench etc. Meanwhile, the clamping component is floatable so as to adjust the position-corresponding relationship of the teeth of the clamping component and the clamping shaft, which can greatly reduce abrasion.

In order that the fastening member may move between the releasing position and the clamping position and drive the second toothed portion to rotate an angle relative to the matched first toothed portion, the moving assembly according to an example of the present disclosure includes a thrust component, wherein the upper end of the thrust component is connected with an end cam in such a way that they are not rotatable relative to each other. The upper end surface of the end cam is provided with a high position and a low position, wherein a smooth transition exists between the high position and the low position Further, a blocking-off pin is provided above the end cam, wherein the high position and the low position can selectively abut against the blocking-off pin.

Further, according to an advantageous structure of the present disclosure, the locking assembly further includes a support base for supporting the clamping component, and the clamping component is mounted in the support base in such a way that the clamping component is not circumferentially rotatable relative to the support base, and the upper end of the support base encloses the lower end of the thrust component in such a way that they are not rotatable relative to each other. Because the clamping component is provided with toothed portions, the clamping component may be configured as two half-annular parts mounted in the support base in order to facilitate manufacturing and assembling.

The present disclosure further provides a resilient element, which acts between the support base and an inner stepped surface of the working end for biasing the fastening member towards the clamping position along axial direction to be clamped against the working end, which can achieve stronger clamping force enough to ensure that the working element is reliably and firmly clamped even in the case that the impacts occur in the tools driven by a vibration driver, for example.

According to another example of the present disclosure, an eccentric component acts on the upper end of the thrust component so that the fastening member moves between the releasing position and the clamping position and drives the second toothed portion to rotate an angle relative to the matched first toothed portion. Also, a rotation block rotatable around the axis Y of the working mandrel is enclosed the outside of the thrust component in such a way that the rotation block is not circumferentially rotatable relative to the thrust component, and the rotation block is connected with the eccentric component.

According to a further improved structure of the present disclosure, the rotation block is provided with a protuberance for limiting rotation, meanwhile, the side surface of the rotation block is provided with a groove, into which a steel ball can be selectively inlayed for enhancing operational hand feeling, wherein another side of the steel ball opposite to the groove is provided with a spring to achieve exact orientation of the operation and enhance operational hand feeling.

In order to prevent the clamping shaft dropping out of the machine at the releasing position, according to a further improved structure of the present disclosure, a damping element or resilient element is provided on the clamping shaft, wherein the damping element is a rubber washer.

DETAILED DESCRIPTION

Various examples of the present disclosure will be further explained hereinbelow by combining with the drawings.

Figure 1:
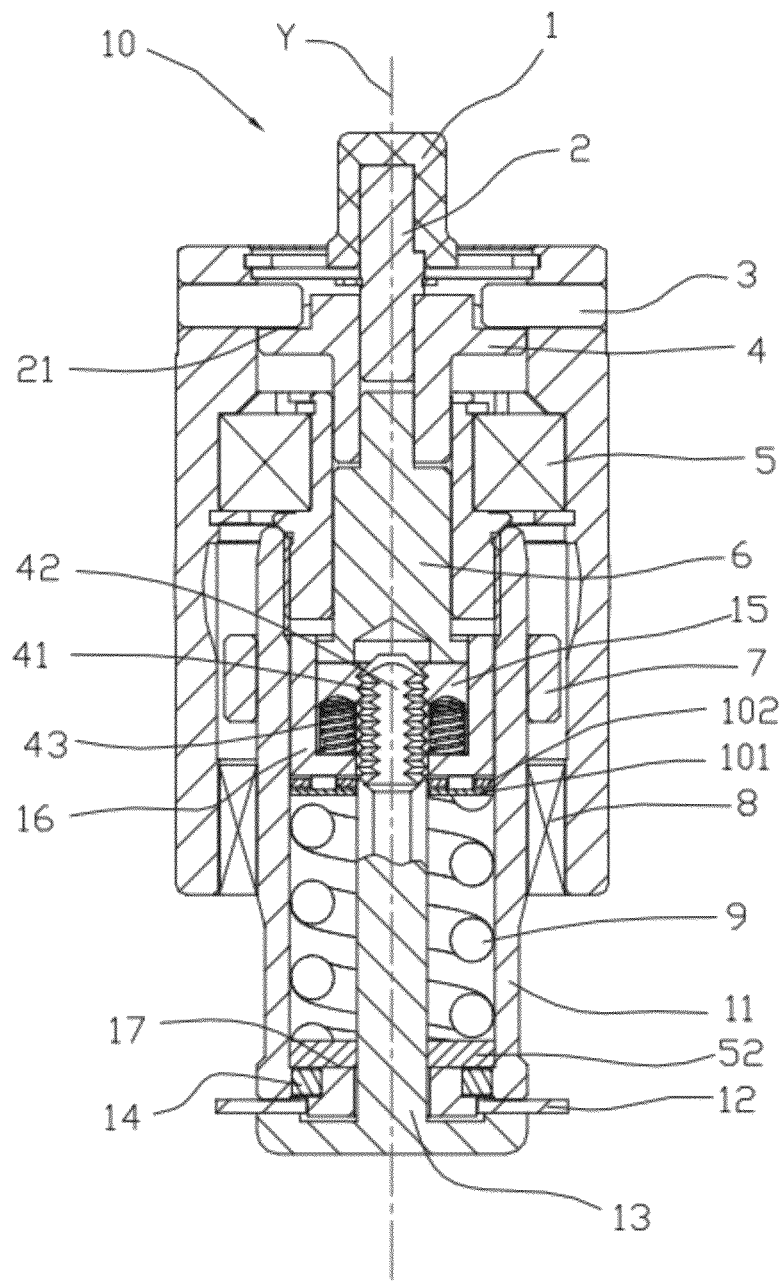
FIG. 1 is a sectional view of an example of the present disclosure, wherein the quick-clamping device of the present hand-held power tool is in the state for clamping the working element.

As shown in FIG. 1, an example hand-held power tool of the present disclosure is shown in a schematic view, wherein its working head is mounted with a quick-clamping device for clamping the working element. The hand-held power tool 10 comprises a working mandrel 11 with two ends thereof being supported on a housing by bearings 5, 8, and further comprises a vibration driving device which drives a working element 12 in a vibrating manner with smaller pivoting angle and higher frequency with respect to the longitudinal axis Y of the working mandrel 11 and which is pressed with interference into the outer circumference of the working mandrel 11 via a swaying bracket 7 so that the working mandrel 11 can sway circumferentially to be operated. Such a hand-held power tool having a vibration driving device is used for many special operations, for example, cutting the panes of motor vehicle by use of vibration driving blades, or sawing, milling and the other operations by use of vibration driving indented blades.

Compared to when the working mandrel is driven by rotation, when the working mandrel is driven by vibration, a larger torque is created along two directions of the vibration and has great driving force, which needs a very large clamping force and a firm mechanism to ensure that the working element is held at the working mandrel in any working conditions. These requirements can be met in the hand-held power tool using the clamping device according to the present disclosure, and this clamping device further can quickly clamp and release the working element without requiring any auxiliary tools.

Figure 3:
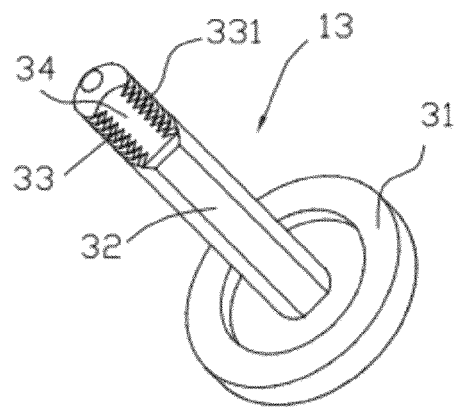
FIG. 3 is a schematic view of the fastening member of the present disclosure.

The clamping device according to the present disclosure includes a fastening member 13 for fastening the working element 12 on the working end of the working mandrel 11. With reference to FIG. 3, the fastening member 13 includes a flange 31 for clamping the working element and a clamping shaft 32 inserted into the hollow working mandrel 11, wherein the clamping shaft 32 is mated with the working mandrel 11 in a manner that the clamping shaft 32 is milled to flat surface so as not to rotate relative to the working mandrel 11. The upper end of the clamping shaft 32 is provided with a first toothed portion 33 for shape-locking a clamping component 15 of the locking assembly received in the working mandrel 11. The toothed portion can be configured as a grooved contour with uniform pitch, and certainly it can also be selected as grooved contours with variable pitch and variable top angle, and the toothed portion extends circumferentially (not along the whole circumference), but the toothed portion is sectional, and is divided into two symmetrical sections, between which it is provided with a planar part 34 milled to flat surface, wherein no tooth is distributed over the planar part 34.

Figure 4:
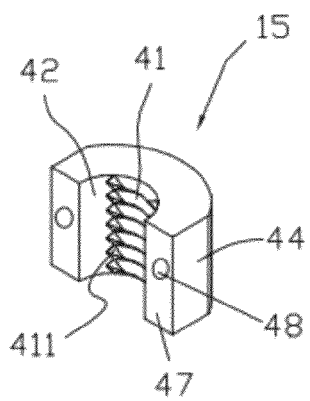
FIG. 4 is a schematic view of the clamping component of the present disclosure.

With reference to FIG. 4, a schematic view of the clamping component 15 for locking and loosening the clamping shaft 32 of the fastening member is illustrated. The example clamping component 15 is provided with a second toothed portion 41 in the same manner for mating with the first toothed portion 33 of the clamping shaft, and a planar zone 42 without tooth distributed thereon is also provided on the two sides of the second toothed portion. The end surfaces of the toothed portions extending circumferentially and being arranged sectionally are provided with chamfers 331, 411 for facilitating the rotational engagement of the first toothed portion 33 and the second toothed portion 41. With such arrangement, it can be understood that, when the fastening member 13 is in the clamping position (FIG. 1), the first toothed portion 33 engages with the second toothed portion 41 so that the clamping shaft 32 is unable to be taken out, while the first toothed portion 33 can disengage with the second toothed portion 41 when the first toothed portion 33 rotates at an angle with respect to the second toothed portion 41 so that the clamping shaft 32 can be taken out of the working mandrel 11, as a result, the fastening member 13 is in the releasing position (see FIG. 2).

Figure 6:
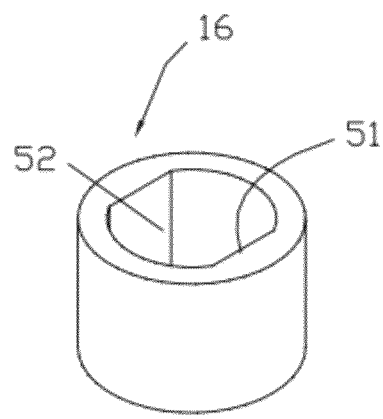
FIG. 6 is a schematic view of the support base for mounting the clamping component.
Figure 10A:
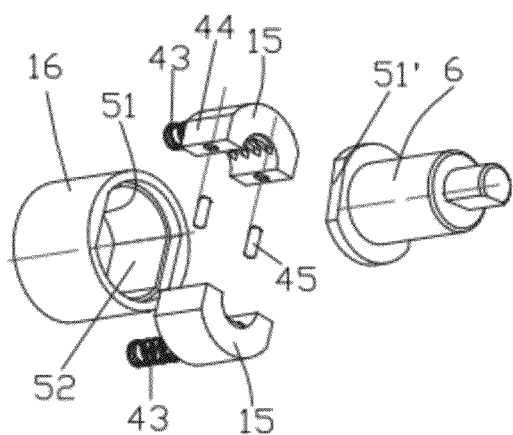
FIG. 10a is an exploded view illustrating the assembly relationship between the thrust component and the locking assembly.
Figure 10B:
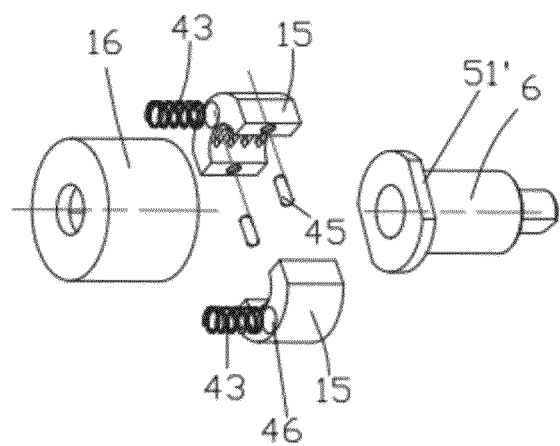
FIG. 10b is an exploded view from another viewing angle illustrating the assembly relationship between the thrust component and the locking assembly.

As shown in FIGS. 4, 10a, 10b and with reference to FIG. 6, for facilitating the manufacturing and assembling, the clamping component 15 of the present example is configured as two half-annular parts which are firmly connected together by pressing-fit a pin shaft 45 to a hole 48 arranged on the mating end surface 47 with interference and can be received in a support base 16 via planar surfaces 44, 51 milled to flat in a manner that the two half-annular parts are unable to rotate circumferentially with respect to the support base 16. The clamping component 15 and the support base 16 jointly constitute the locking assembly and the two operate together.

In order to provide a stronger clamping force enough to ensure that the working element is clamped reliably and firmly even in the case that the impacts occur in the tool driven by vibration driver, for example, according to the present disclosure, a second resilient element 9 is further mounted between the bottom end of the support base 16 and the inner stepped surface 17 of the working mandrel 11, for biasing the fastening member 13 towards the clamping position along the direction of longitudinal axis Y to clamp against the end of the working mandrel 11. In order to overcome the elastic force of the second resilient element 9 and to make it have a reliable resilience value, the upper end of the support base with respect to the resilient element 9 is provided with a moving assembly comprising a thrust component 6.

Figure 5:
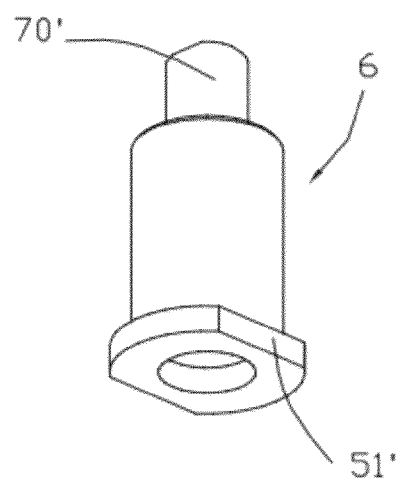
FIG. 5 is a schematic view of the thrust component of the present disclosure.

With reference to FIG. 5 and FIG. 6, the lower end of the thrust component 6 encloses the upper end of the support base 16 and mates therewith via an upper flat position 51 of the support base and an upper flat position 51' of the thrust component which are all milled to flat. There is a small gap 103 between the flat positions 51, 51' by which the vibration transferred from the sway of the working mandrel 11 can be interrupted. In addition, the upper end of the thrust component 6 is connected with an end cam 4 in such a manner that they are unable to rotate relative to each other.

Figure 7:
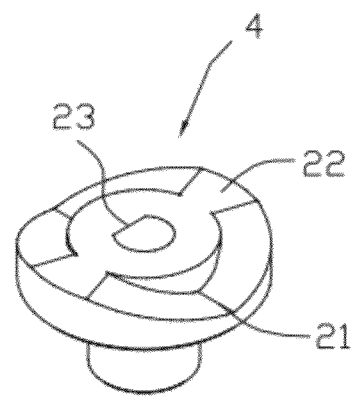
FIG. 7 is a schematic view of the end cam of the present disclosure.

With reference to FIG. 7, the upper end surface of the end cam 4 is provided with a high position 22 and a low position 21, wherein it is a smooth transition between the high position 22 and the low position 21. A blocking-off pin 3 is provided above the end cam 4 and fixedly connected to the tool body. The end cam 4 is rotatable via an operation handle 1 so that the high position 22 and the low position 21 can selectively abut against the blocking-off pin 3. A lug boss 24 for limiting rotation is provided on the lower end surface of the end cam 4. The operation handle 1 is provided with a handle shaft 2 which is connected with the end cam 4 via a surface 23 milled to flat in such a manner that the handle shaft 2 is unable to rotate relative to the end cam 4. A gasket 101 and a thrust bearing 102 are further provided between the resilient element 9 and the support base 16, the function of which is to change the sliding friction between the resilient element 9 and the support base 16 to rolling friction, so that the friction force is reduced and the operation handle 1 can be rotated in a more labor saving way.

Figure 2:
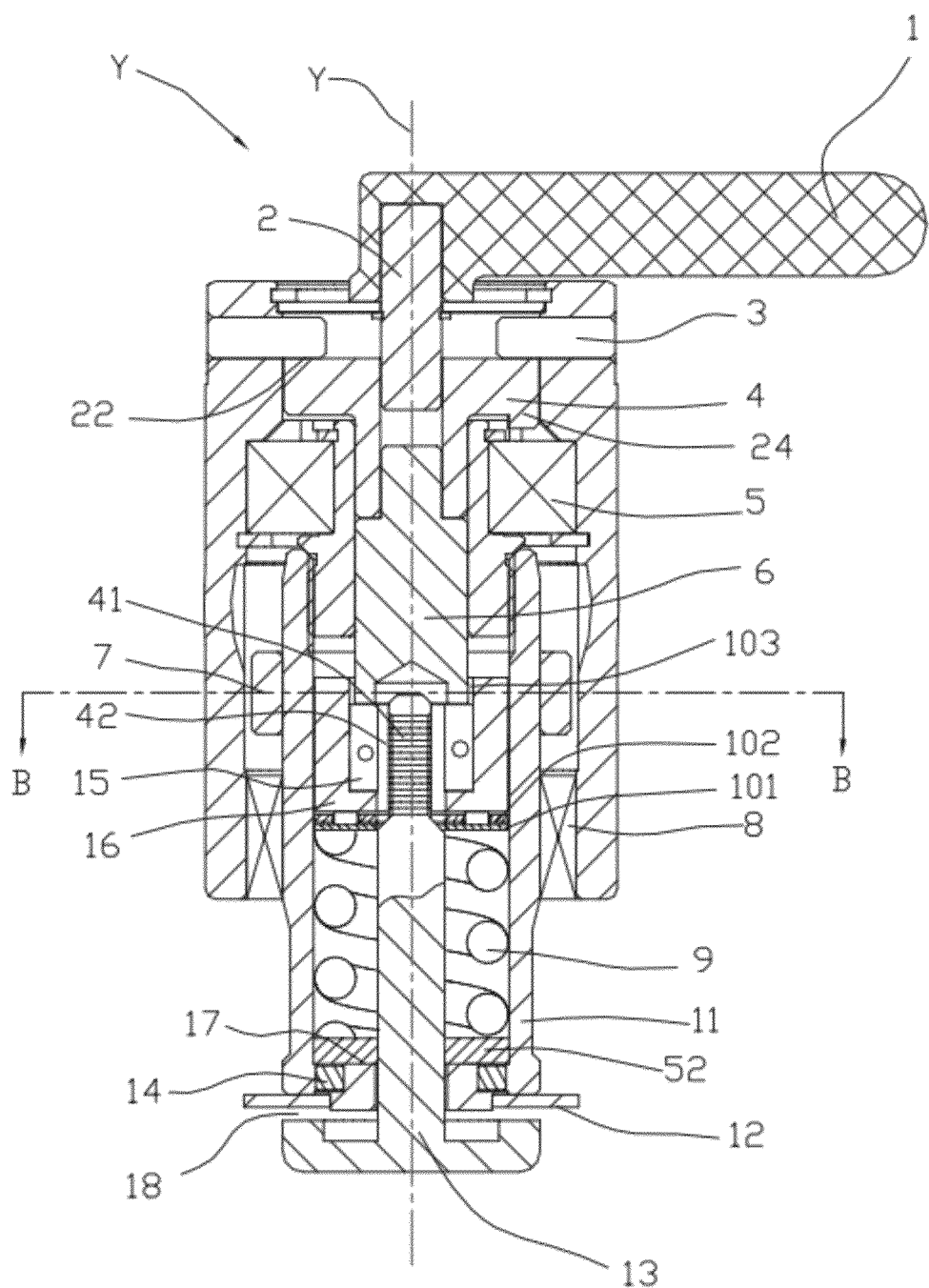
FIG. 2 is a sectional view illustrating that the operating handle of FIG. 1 rotates 90° so that the quick-clamping device of the present hand-held power tool is in the state for loosening the working element.

The working principle of the present disclosure may be explained, for example by comparing FIG. 1 with FIG. 2. FIG. 1 illustrates the state of the working element being clamped, wherein the blocking-off pin 3 abuts against the low position 21 on the upper end surface of the end cam 4. Under the action of the second resilient element 9, the locking assembly and the moving assembly tends to lift upwards. Because the clamping shaft 32 of the fastening member 13 is engaged with the clamping component 15 of the locking assembly, the fastening member 13 also creates a force pressing towards the working mandrel 11, so that the working element 12 is firmly clamped between the working end of the working mandrel 11 and the flange 31 of the fastening member 13.

FIG. 2, meanwhile, illustrates the state of the working element being released. The operation handle 1 is rotated 90°, at this time the handle shaft 2 would drive the end cam 4, the thrust component 6 and the locking assembly to rotate 90° together, so that the clamping shaft 32 disengages from the clamping component 15. Meanwhile, the rotating end cam 4 drives the blocking-off pin 3 to slide onto the high position 22 on the upper end surface of the end cam. Because the blocking-off pin 3 is fixed, the end cam 4 tends to have a displacement moving downwardly, then all of the thrust component 6, the locking assembly and the clamping shaft 32 would move downwardly, so that a gap 18 appears in the area where the upper end surface of the flange 31 of the fastening member 13 contacts the working element 12. At this time, the fastening member 13 can be firstly taken down, and then the working element 12 is taken down, thus the releasing process is completed.

In order to prevent the clamping shaft 32 from directly dropping out of the machine under action of gravity during the releasing process, in this example, a damping element 52 is enclosed the outside of the clamping shaft 32 which may be a rubber washer, in this case, the clamping shaft 32 wouldn't automatically drop out of the machine, but it needs to be pulled out by hand. The principle consists in that, the diameter of the inner orifice of the rubber washer is slightly smaller than the diameter of the clamping shaft, because the rubber washer is elastic, the clamping shaft can be inserted into the orifice of the rubber washer, and the rubber washer exerts damping onto the clamping shaft. The rubber washer is a damping element and can also be replaced with other structures such as a reed etc.

With reference to FIG. 10a and FIG. 10b, the clamping component 15 according to the present disclosure can also be configured as floatable along the longitudinal axis Y of the working mandrel 11. Specifically, a hole 46 for receiving a first resilient element 43 is drilled on the bottom surface of the clamping component 15. The first resilient element 43 may be a spring mounted in the hole 46, wherein the upper end of the spring abuts against the top end of the hole 46, and the lower end of the spring abuts against the inner end surface of the support base 16. After the thrust component 6 and the clamping component 15 are assembled into a cavity 52 of the support base 16, because the height of the part enclosed by the support base 16 and the thrust component 6 is greater than the height of the clamping component 15, the clamping component 15 is floatable in the cavity 52. The function consists in that, when the teeth of the clamping component 15 and the clamping shaft 32 are not just in the tooth-versus-groove case, the clamping component 15 floats so as to adjust the position-corresponding relation of the teeth of the clamping component 15 and the clamping shaft 32, which would greatly reduce abrasion.

Figure 8:
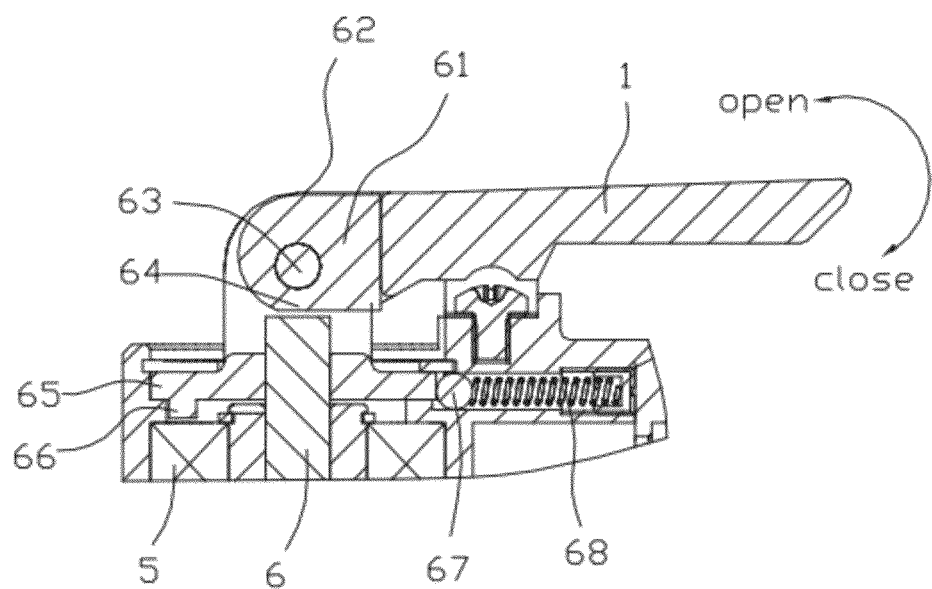
FIG. 8 is a partial sectional view of another example of the present disclosure.
Figure 9:
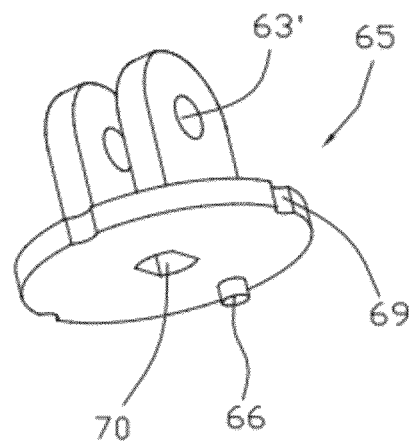
FIG. 9 is a schematic view of the rotation block of FIG. 8.

As shown in FIGS. 8-9, the difference between the example of FIGS. 1-7 and the present example mainly consists in the moving assembly. In the example of FIGS. 1-7, the end cam 4 acts on the thrust component 6 of the moving assembly, while in the example of FIGS. 8-9, it is an eccentric component 61 acting on the thrust component 6, that is, the eccentric component 61 can selectively abut against the thrust component 6 via a short diameter extruding surface 64 and a long diameter extruding surface 62 with respect to an rotation shaft 63 to drive the thrust component 6 to move axially.

With reference to FIG. 9, the eccentric component 61 is connected with a rotation block 65 rotatable with respect to the longitudinal axis Y of the working mandrel 11, and the rotation shaft 63 passing through the eccentric component 61 simultaneously further passes through a lug boss hole 63' on the rotation block 65. As can be seen with reference to FIG. 5 and FIG. 9, a waist-shaped shaft 70' on the upper end of the thrust component 6 is inserted into and connected with a waist-shaped hole 70 of the rotation block 65 in a manner that they are unable to rotate relative to each other. In order to achieve exact orientation in operation and enhance operational hand feeling, according to the present disclosure, the rotation block 65 is provided with a protuberance 66 for limiting rotation, and the side surface of the rotation block 65 is provided with a groove 69, into which a steel ball 67 can be selectively inlayed when the rotation block 65 rotates, wherein another side of the steel ball 67 opposite to the groove 69 is provided with a spring 68.

The other parts of the example of FIGS. 8-9 are all the same as those of the example illustrated in FIGS. 1-7.

In this example, the operation handle 1 drives the eccentric component 61 to rotate around the rotation shaft 63. In the clamped state, the short diameter extruding surface 64 corresponds to the upper end of the thrust component 6, and at this time the clamping shaft 32 engages with the clamping component 15. If the working element is intended to be detached, the operation handle 1 is needed to drive the eccentric component 61 to rotate around the rotation shaft 63 till the position where the long diameter extruding surface 62 abuts against the thrust component 6, and the operation handle 1 further drives the rotation block 65, the thrust component 6 and the locking assembly to rotate 90° around the longitudinal axis Y of the working mandrel 11. In this case, the clamping shaft 32 disengages with the clamping component 15 so that the fastening member 13 is released and the working element 12 can be detached.

According to the present disclosure, in order to avoid manual assistance during clamping and mounting the working element 12 so that the working element is primarily fastened onto the working end of the working mandrel 11, the working mandrel 11 is provided with a magnet which can attract the working element 12.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

I claim:

1. A hand-held power tool with a quick-clamping device for a working element, comprising:
a working mandrel for driving the working element, the working mandrel having a working end;
a fastening member for fastening the working element onto the working end, the fastening member including a clamping shaft insertable into the working mandrel;
a moving assembly for making the fastening member move between a releasing position and a clamping position, wherein said fastening member is detachable from said working mandrel at the releasing position and said fastening member is clampable against the working end of said working mandrel by means of a clamping force at the clamping position; and
a locking assembly received in said working mandrel, for locking said clamping shaft at said clamping position so that the clamping shaft cannot be taken out, and for loosening said clamping shaft at said releasing position so that the clamping shaft can be taken out of said working mandrel,
wherein said locking assembly includes a clamping component moveable along the direction of a longitudinal axis of said working mandrel and provided with a second toothed portion, and said clamping shaft is provided with a first toothed portion for mating with the second toothed portion, wherein both the second toothed portion and the first toothed portion have teeth extending circumferentially so that the second toothed portion engages with the first toothed portion at said clamping position and the second toothed portion disengages from the first toothed portion at said releasing position,
wherein said moving assembly further comprises a thrust component, wherein an upper end of the thrust component is connected with an end cam in such a way that they are not rotatable relative to each other, and the upper end of the end cam is provided with a high position and a low position, wherein the end cam is rotated about the longitudinal axis to provide a smooth transition between the high position and the low position.

2. The hand-held power tool with a quick-clamping device for a working element according to claim 1, further comprising a first resilient element exerting force along the direction of the longitudinal axis acts on said clamping component.

3. The hand-held power tool with a quick-clamping device for a working element according to claim 2, wherein the direction along which the first resilient element exerts force onto said clamping component is the direction along which the fastening member inserts into the working mandrel.

4. The hand-held power tool with a quick-clamping device for a working element according to claim 1, further comprising a blocking-off pin provided above said end cam, wherein said high position and said low position can selectively abut against said blocking-off pin.

5. The hand-held power tool with a quick-clamping device for a working element according to claim 1, wherein said locking assembly further comprises a support base for supporting said clamping component, and the upper end of said supporting base encloses the lower end of said thrust component.

6. The hand-held power tool with a quick-clamping device for a working element according to claim 5, further comprising a second resilient element arranged between said supporting base and an inner stepped surface of said working end.

7. The hand-held power tool with a quick-clamping device for a working element according to claim 1, further comprising at least one of a damping element or a resilient element on the clamping shaft.

8. The hand-held power tool with a quick-clamping device for a working element according to claim 7, wherein the damping element is a rubber washer.

9. The hand-held power tool with a quick-clamping device for a working element according to claim 1, wherein said teeth are arranged circumferentially and sectionally.

10. The hand-held power tool with a quick-clamping device for a working element according to claim 9, wherein an end surface of said teeth are provided with chamfers for facilitating the rotational engagement of the first toothed portion and the second toothed portion.

11. The hand-held power tool with a quick-clamping device for a working element according to claim 1, wherein the working mandrel further comprises a magnet for attracting the working element.

\* \* \* \* \*